(12) United States Patent
Grebner et al.

(10) Patent No.: US 8,786,433 B2
(45) Date of Patent: Jul. 22, 2014

(54) REPORTING AND MANAGING INCIDENTS

(75) Inventors: Olaf Grebner, Haunetal (DE); Max Bruchmann, Darmstadt (DE); Christian Guckelsberger, Mainz (DE); Florian Probst, Darmstadt (DE); Axel Schulz, Bensheim (DE)

(73) Assignee: SAP AG, Walldorf (DE)

( * ) Notice: Subject to any disclaimer, the term of this patent is extended or adjusted under 35 U.S.C. 154(b) by 272 days.

(21) Appl. No.: 13/535,384

(22) Filed: Jun. 28, 2012

(65) Prior Publication Data

US 2014/0002263 A1 Jan. 2, 2014

(51) Int. Cl.
*G08B 21/00* (2006.01)
*G08B 25/14* (2006.01)
*G08B 25/00* (2006.01)

(52) U.S. Cl.
CPC ............. *G08B 25/00* (2013.01); *G08B 25/14* (2013.01)
USPC .......................................... 340/540; 709/204

(58) Field of Classification Search
CPC ................................. G08B 25/00; G08B 25/14
USPC ......................................................... 340/540
See application file for complete search history.

(56) References Cited

U.S. PATENT DOCUMENTS

| 2011/0087510 A1* | 4/2011 | Putra et al. ............... 705/7.13 |
| 2012/0066345 A1* | 3/2012 | Rayan et al. ............. 709/218 |
| 2013/0325943 A1* | 12/2013 | Al-Harthi .................. 709/204 |

* cited by examiner

*Primary Examiner* — Kerri McNally

(57) ABSTRACT

Various embodiments of systems and methods for reporting and managing incidents are described herein. In one aspect, the method includes identifying a user logged into an incident reporting and alerting portal. A category for the logged-in user is identified. The category includes one of a reporter, a volunteer, and a responder. An incident report is received from the reporter. It is determined whether a comment is received on the incident report from the responder. When the comment is received, the comment is notified to the reporter. It is determined whether a reply to the comment is received from the reporter. When the reply to the comment is received, the reply is notified to the responder who commented on the incident report.

20 Claims, 11 Drawing Sheets

TO: emergency@incrpt.com

CC:

SUB:

INCIDENT DETAILS:

LOCATION OF INCIDENT:

DATE OF INCIDENT:

TIME OF INCIDENT:

WHAT HAPPENED:

FIG. 5

REPORTING AND MANAGING INCIDENTS

BACKGROUND

Incidents posing a level of threat to life, health, property, or environment should be reported. Incidents include, for example, a riot, a fire in a factory, a flood, an earthquake, etc. Now-a-days, people can report incidents using the internet on social media websites such as Twitter®, Facebook®, etc. Various social media sites are dedicated for gathering information on specific type of incidents. For example, Twitter® Earthquake Detector (TED) site is dedicated for gathering information on earthquake. Typically, TED can help people monitor the probability of occurrence of earthquake in a particular region. People can also discuss or inquire about incidents using the social media sites. Discussions on social media sites may be open ended wherein relevant information may not be channelized to the right people who may execute actions to prevent damages caused by the incidents,

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 5 is a block diagram of an email window generated to enable the reporter to report an incident via an email, according to an embodiment.

DETAILED DESCRIPTION

Embodiments of techniques for reporting and managing incidents are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

The following terminology is used while disclosing embodiments. One skilled in the art will recognize that these terms and examples they are used in are merely illustrative.

A participant or a user is a person who uses an incident reporting and alerting portal (IRAP) or other social media sites such as Twitter®, Facebook®, etc., for reporting incidents or exchanging information on incidents.

A reporter is a participant who reports about an incident. For example, the reporter may share photographs and/or news related to any disaster or incident. In one embodiment, the reporter generates and submits an incident report related to the incident.

A volunteer is a participant who is typically (may not exclusively) associated with an emergency management organization like firefighters, rescue services, etc. The volunteer may be trained or may have profound knowledge in a particular emergency management domain. In one embodiment, the volunteer rates, edits, or spreads information provided by the reporter.

A responder is a participant who may actively work to prevent or mitigate a disaster or an emergency. In one embodiment, the responder may be the volunteer who works actively to mitigate or prevent the emergency.

Figure 1:
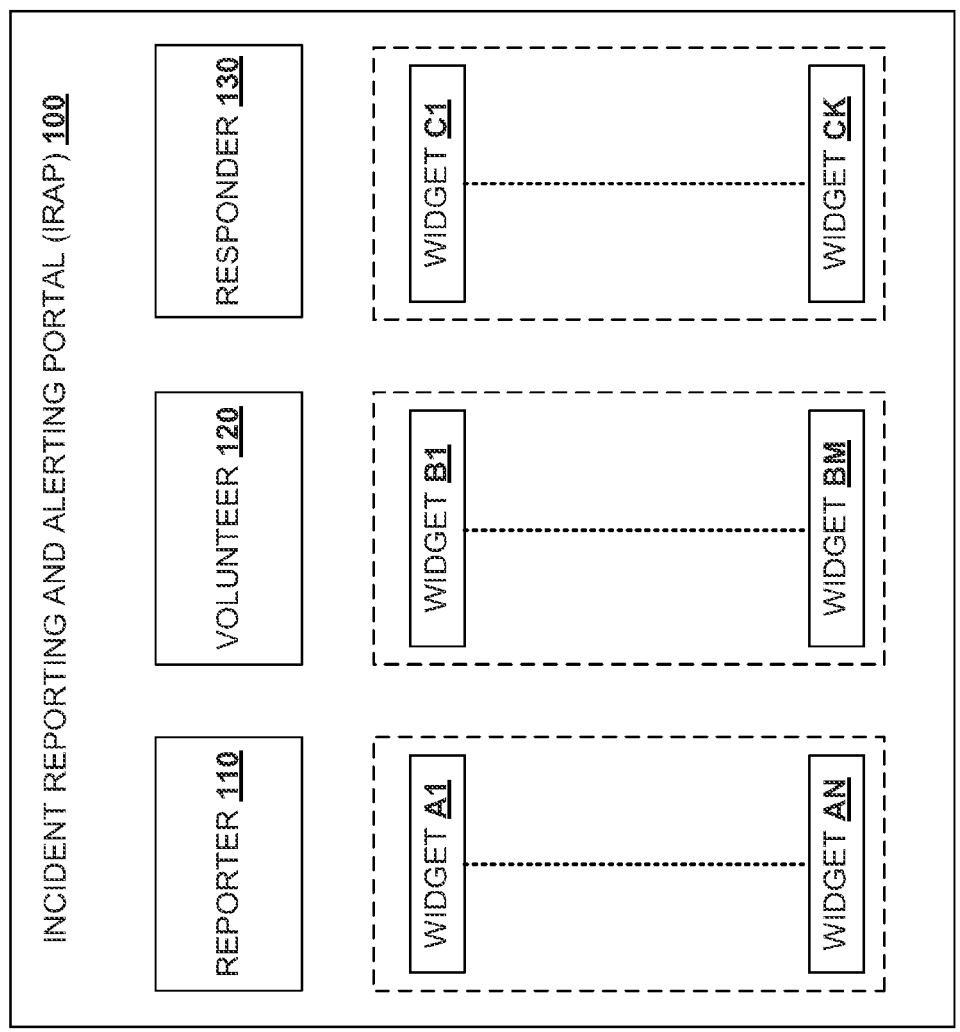
FIG. 1 is a block diagram of an incident reporting and alerting portal (IRAP) including various categories of users such as a reporter, a volunteer, and a responder for reporting and managing incidents, according to an embodiment.

FIG. 1 illustrates a block diagram of an incident reporting and alerting portal (IRAP) 100 for reporting and managing incidents according to one embodiment. One or more users or participants can log into the IRAP 100. A logged-in user may be categorized as one of a reporter 110, a volunteer 120, and a responder 130. The IRAP 100 categorizes the logged-in user under a suitable category 110-130 as per the user's choice or eligibility. Each category 110-130 represents a specific role to be played by the user. One or more widgets or tools are provided corresponding to each category 110-130. For example, the user categorized as the reporter 110 is provided widgets A1-AN to report an incident. The reporter 110 may use the widgets A1-AN to generate the incident report related to the incident and submit the incident report. Similarly, the volunteer 120 is provided widgets B1-BM to encourage the reporter 110 to report incidents. For example, a widget BM may be a 'report incident' icon which the volunteer 120 can place on social networking websites to encourage the reporter 110 to report the incident. The responder 130 is provided widgets C1-CK to inquire about the incident report or to comment on the incident report.

Figure 2:
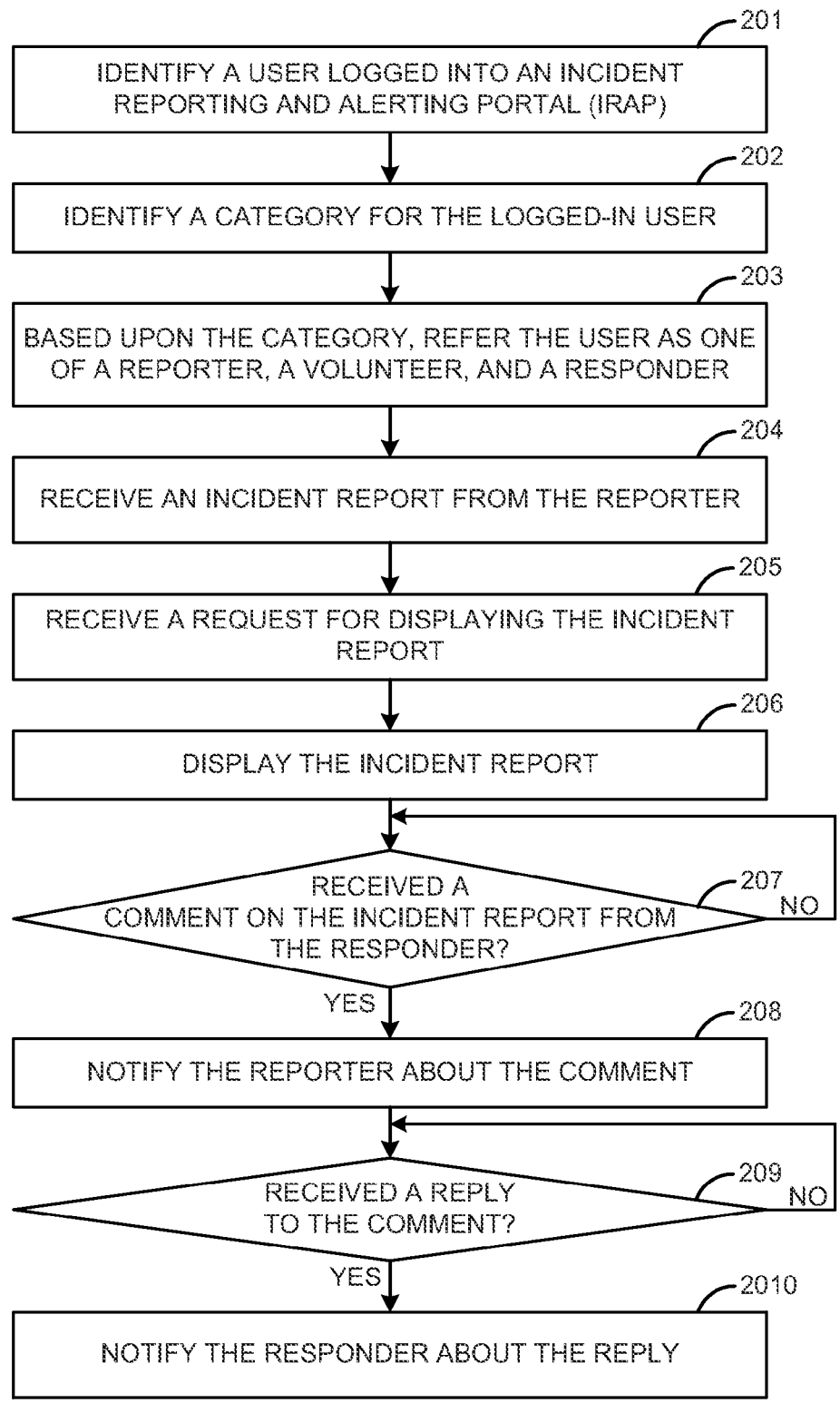
FIG. 2 is a flow chart illustrating the steps performed for reporting and managing incidents, according to an embodiment.

FIG. 2 is a flowchart illustrating a method for reporting and managing incidents using an incident reporting and alerting portal (IRAP), according to one embodiment. A participant or a user logged into the IRAP is identified at step 201. The user is categorized into various categories. For example, the user may be categorized as a reporter, a volunteer, or a responder. In one embodiment, the user exclusively requests or specifies the category in which the user wants to get registered. For example, the user may specify that the user wants to get categorized or registered as the reporter. In another embodiment, the category of the user is identified from an action performed by the user. The category of the user is identified at step 202. Based upon the identified category, the user is referred as the reporter, the volunteer, or the responder at step 203.

The reporter usually generates an incident report related to an incident. The generated incident report is submitted by the reporter. The submitted incident report is received at step 204. In one embodiment, the submitted incident reports are stored in a list which may be rendered on the IRAP. The user sends a request for displaying the incident report at step 205. In one embodiment, the request may be sent by selecting the incident report front the list. The selected incident report is rendered on a user interface (UI) at step 206. In one embodiment, the responder may inquire about the incident report. It is determined whether the comment or inquiry is received related to the incident report at step 207. If the comment is received (step 207: YES), the comment is notified to the reporter who submitted the incident report at step 208. In one embodiment, the reporter submits a reply to the comment. It is determined whether the reply to the comment is submitted at step 209. If the reply to the comment is submitted (step 209: YES), the reply is notified to the responder who commented on the incident report at step 2010. In one embodiment, the reply is also notified to one or more users interested in the incident.

Figure 3:
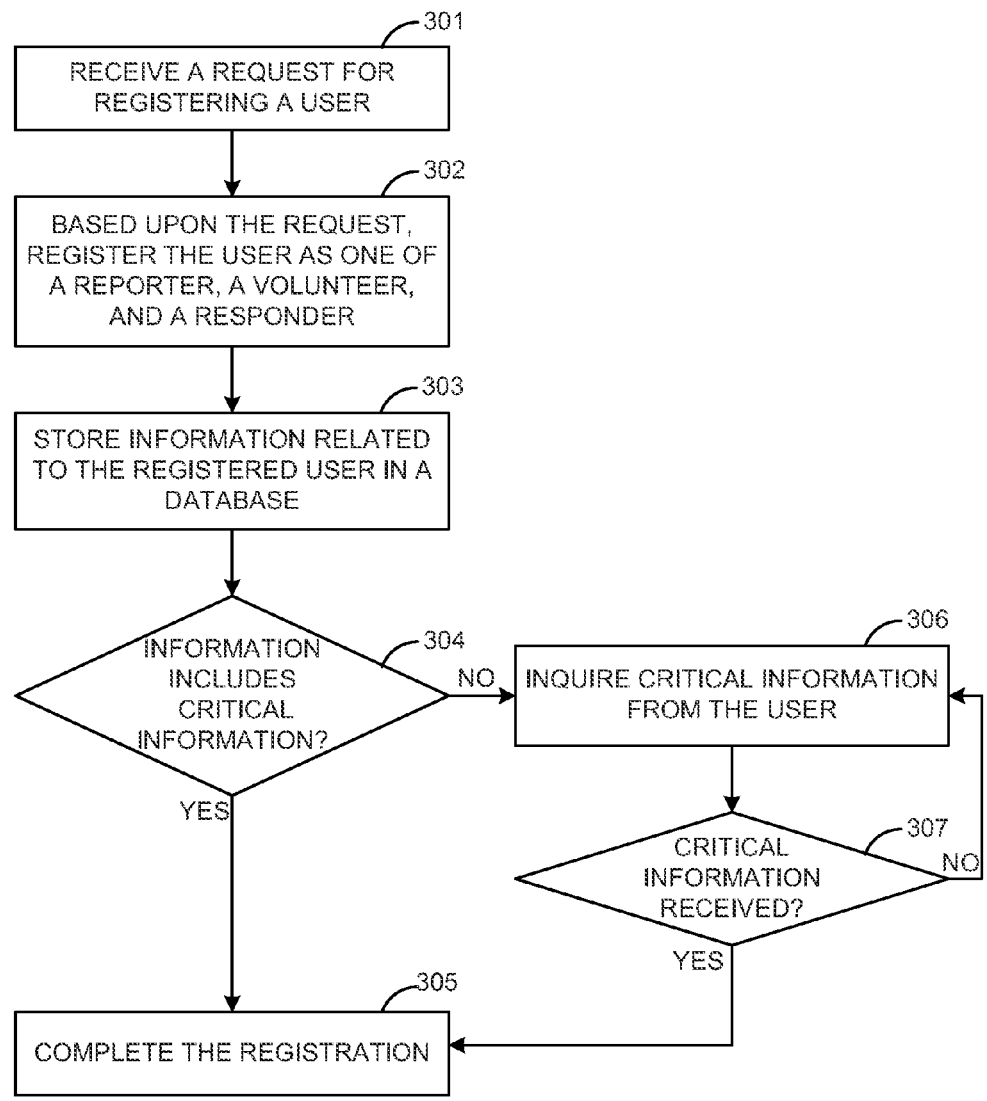
FIG. 3 is a flow chart illustrating the steps performed to register a user under a specific category for handling incidents, according to an embodiment.

FIG. 3 is a flowchart illustrating a method for registering users under various categories for handling incidents, according to one embodiment. The user may request to get registered under a suitable category, e.g., the reporter, the volunteer, and the responder. The request for registering the user under the suitable category is received at step 301. In one embodiment, the request may be triggered by an action performed by the user. Based upon the request, the user is registered as one of the reporter, the volunteer, or the responder at step 302. In one embodiment, during registration, the user is asked to provide various personal and/or professional information. The information related to the registered users is stored in a database at step 303. In one embodiment, the information provided by the user at the time of registration may not be complete. For example, the information may not include contact information of the user. It is determined whether the information includes various critical information at step 304. In one embodiment, the critical information includes at least one of a contact number of the user, an email ID of the user, an address of the user, etc. If the user has provided the critical information (step 304: YES), the registration is completed at step 305. In case the user has not provided the critical information (step 304: NO), inquire about the critical information from the user at step 306. It is determined whether the critical information is received from the user at step 307. If the critical information is received (step 307: YES), the registration is complete at step 305. If the critical information is not received (step 307: NO), the critical information is inquired until the critical information is provided. In one embodiment, the critical information is requested periodically until the critical information is provided.

Figure 4:
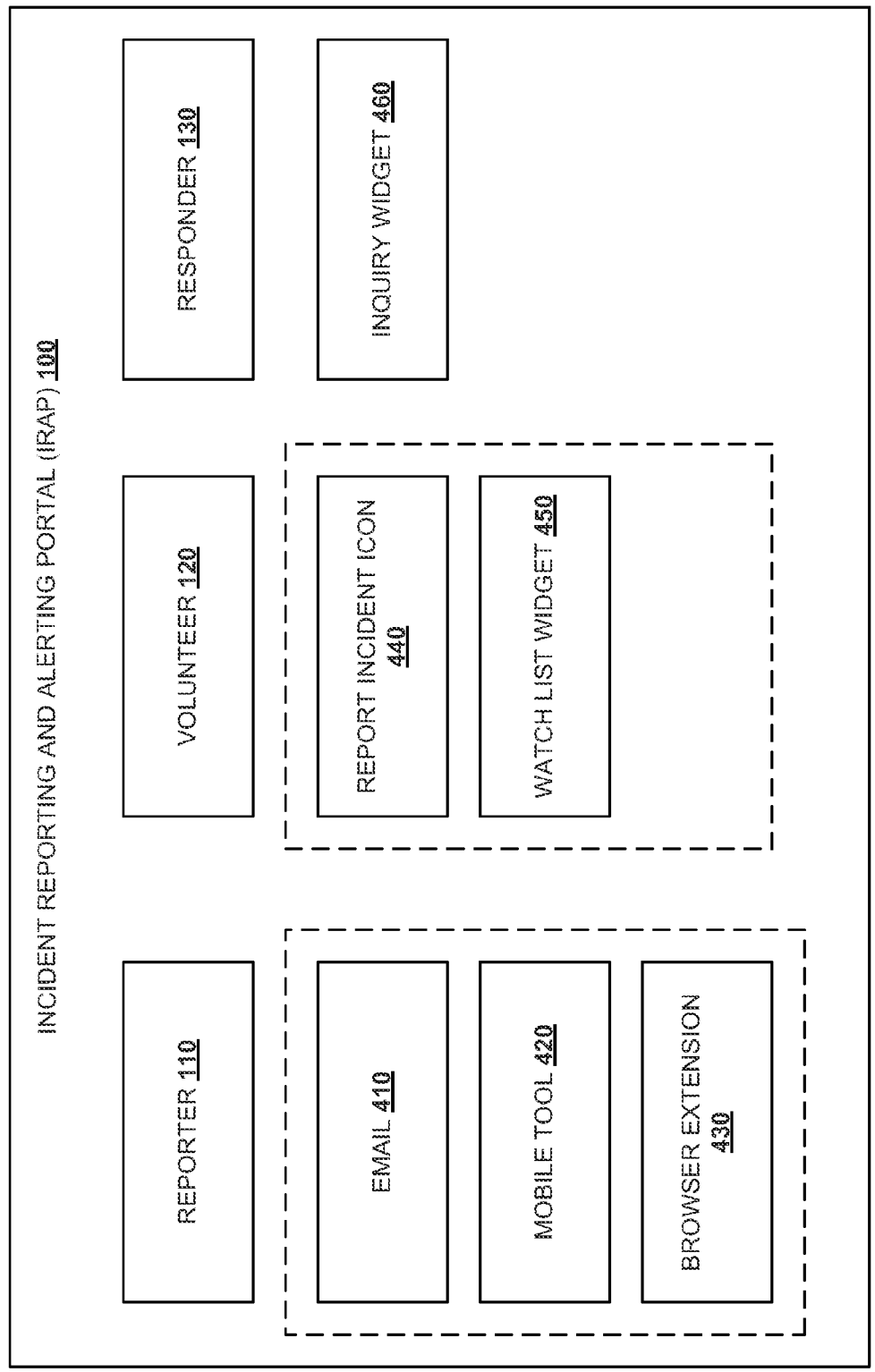
FIG. 4 is a block diagram of the incident reporting and alerting portal (IRAP) including various widgets for reporting and managing incidents, according to an embodiment.

FIG. 4 illustrates a block diagram of the incident reporting and alerting portal (IRAP) 100 for reporting and managing incidents according to one embodiment. One or more users or participants logs into the IRAP 100. In one embodiment, the user visiting the IRAP 100 is the logged-in user. The logged-in user may be categorized as one of the reporter 110, the volunteer 120, and the responder 130. In one embodiment, the IRAP 100 categorizes the user based upon the action performed by the user. For example, if the user has submitted an incident report the user is automatically categorized as the reporter 110. In another embodiment, the IRAP 100 categorizes the user based upon a request received from the user. For example, the user may request to get categorized as the volunteer 120 and based upon the request the IRAP 100 categorizes the user as the volunteer 120. The user may send the request or specify the category of their choice during a first time logging into the IRAP 100. Each category 110-130 represents a specific role to be played by the user.

The users registered under various categories 110-130 are provided various widgets. For example, the users registered as the reporter 110 are provided widgets such as email tool 410, a mobile tool 420, and a browser extension tool 430 to report the incidents. In one embodiment, the reporter 110 can report the incident by sending an email to a registered email ID. In one embodiment, when the reporter 110 selects the email tool 410, an email window 500 (FIG. 5) with 'To' field of the email window 500 automatically populated with a registered email ID 510 (e.g., emergency@incrpt.com) is generated. In one embodiment, the email window 500 is generated from the reporter 110 personal email tools available on the reporter 110 computer systems, e.g., Microsoft® Outlook. The reporter 110 can compose the email including various details about the incident, e.g., data of the incident, location of the incident, and description of the incident. The composed email is sent on the registered email ID. The volunteer 120 can read the emails received on the registered email ID.

In one embodiment, the mobile tool 420 enables the reporter 110 to report the incidents from any mobile device, e.g., a cell phone. In one embodiment, the reporter 110 can report incident via a short messaging services (SMS). The reporter 110 can send the SMS to a registered cell phone for reporting incidents. In one embodiment, when the mobile tool 420 is selected the SMS may be composed and send to the registered cell phone. In one embodiment, the volunteer 120 can read the SMS received on the registered cell phone. In another embodiment, the volunteer 120 composes the incident report based upon the email or the SMS received from the reporter 110

Figure 6:
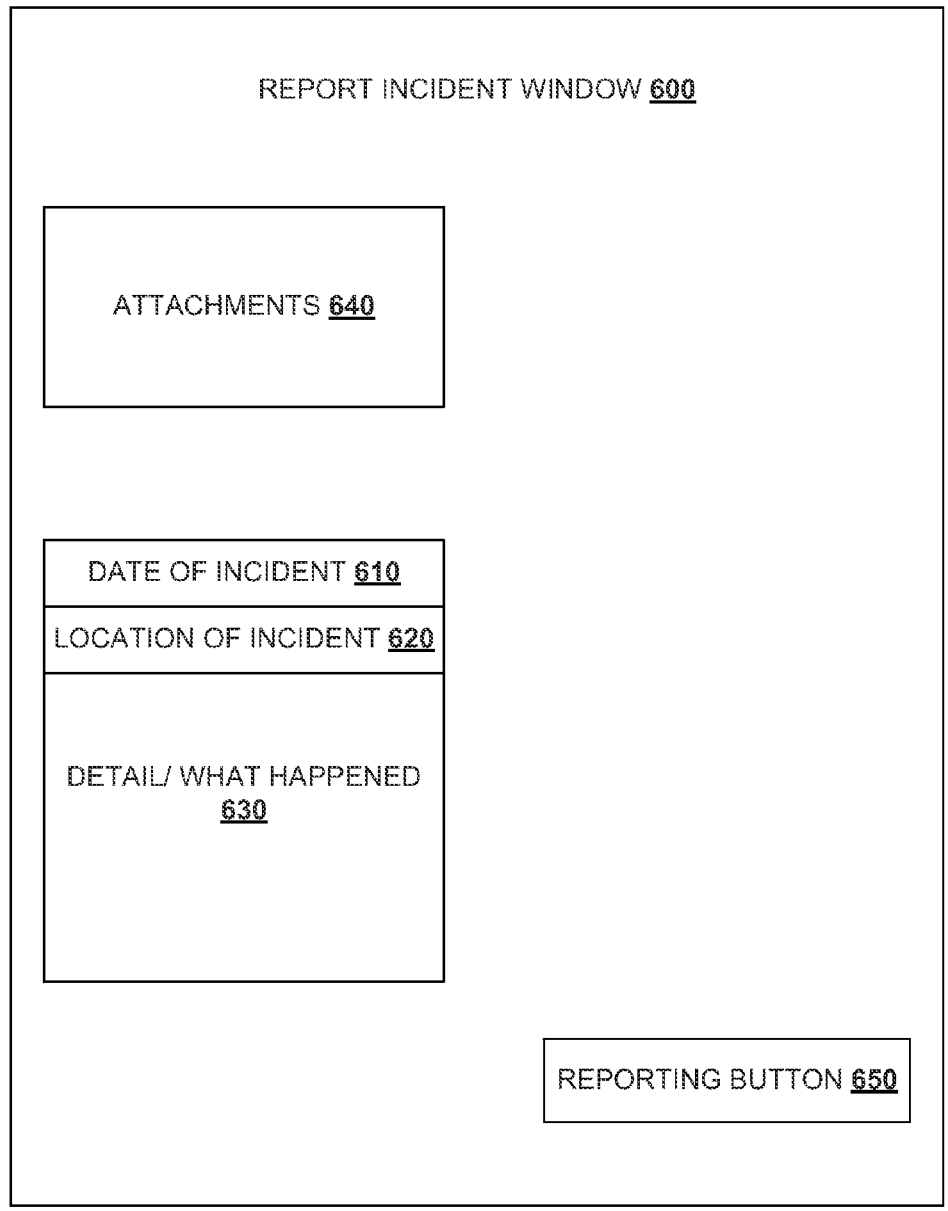
FIG. 6 is a block diagram of a report incident window generated by selecting a report incident icon by the reporter for reporting the incident, according to an embodiment.

In one embodiment, the reporter 110 generates the incident report, e.g., I1, by using the browser extension tool 430. In one embodiment, the browser extension tool 430 is a 'reporting icon' which may be selected by the reporter 110. Once the 'reporting icon' is selected, an incident report window 600 (FIG. 6) is generated. The report incident window 600 enables the reporter 110 to report the incident. The report incident window 600 includes various fields, e.g., date field 610 for mentioning the date of the incident, location field 620 for mentioning location of the incident, a description field 630 for mentioning details of the incident like what happened, and an attachment field 640 for uploading or attaching at least one of an image, an audio, and a video related to the incident. The report incident window 600 also includes a 'reporting' button 650. Once the details of the incident are completed by the reporter 110, the reporting button 650 may be triggered or selected. Upon selecting the reporting button 650, the incident report I1 is submitted on the IRAP 100. The submitted reports are stored in a database. In one embodiment, a confirmation message is sent to the reporter 110 who submitted the incident report I1.

Figure 7:
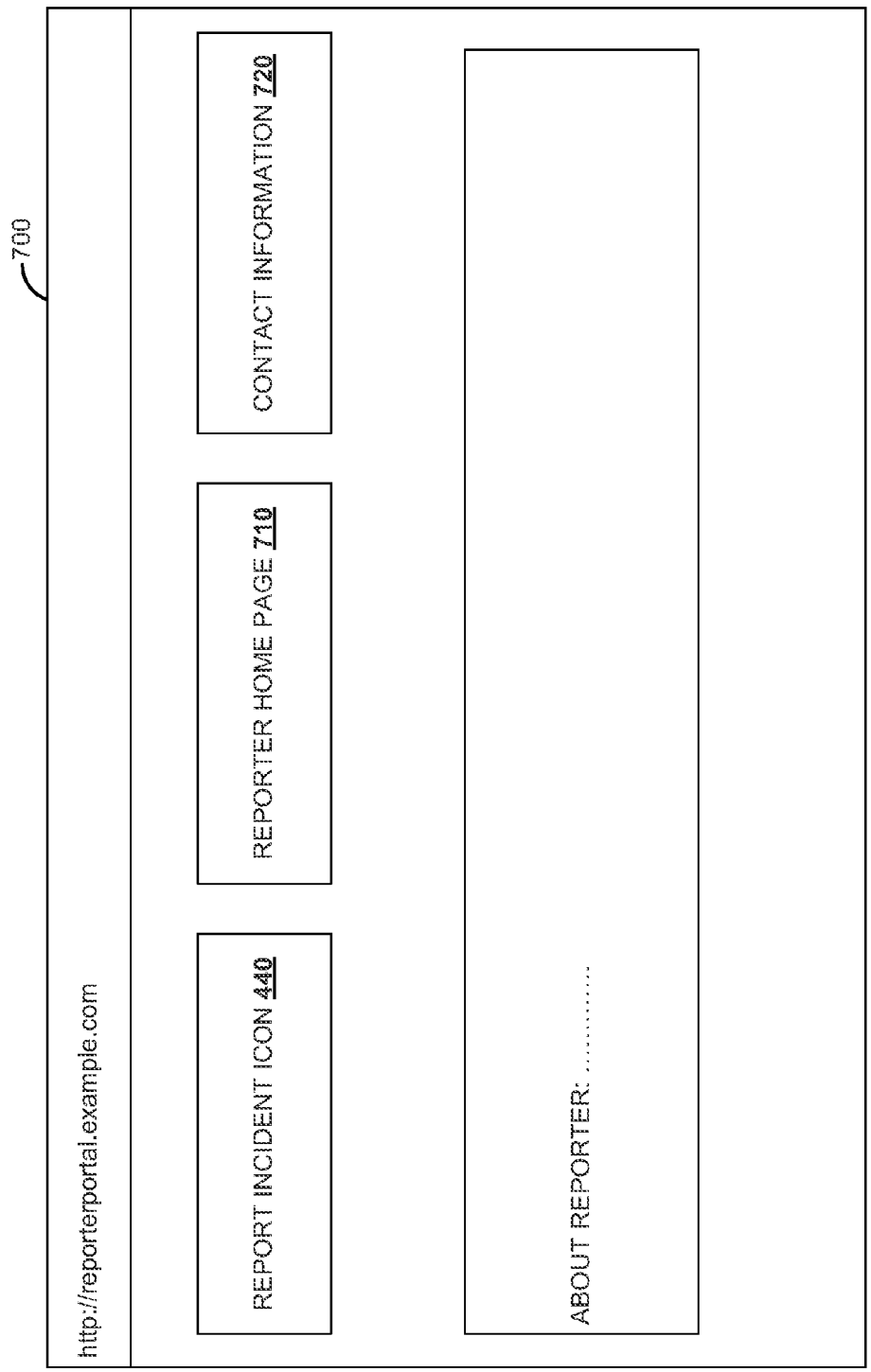
FIG. 7 illustrates a reporter portal or browser including the report incident icon for reporting incidents, according to an embodiment.

In one embodiment, the reporter 110 creates their own website or a browser 700 (FIG. 7) for reporting incidents or submitting the incident reports. The reporter website 700 may include a reporter home page 710 and contact information 720 of the reporter. In one embodiment, the volunteer 120 is provided a widgets 440 (e.g., a 'report incident' icon) which the volunteer 120 can place on the reporter browser 700 to encourage the reporter 110 for reporting incidents or submitting incident reports, e.g., I1.

Figure 8:
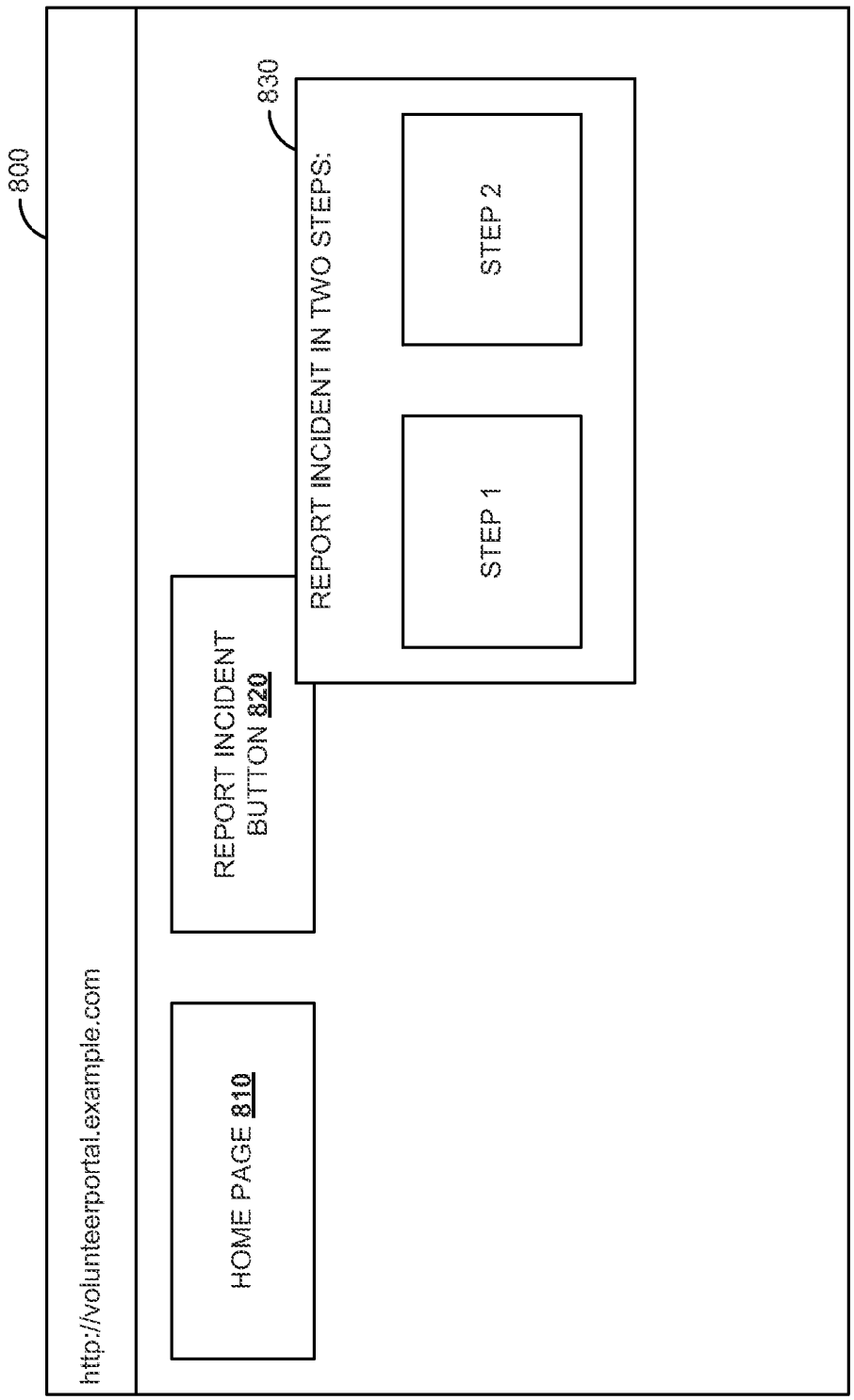
FIG. 8 illustrates a volunteer portal or browser including a report incident button for reporting incidents, according to another embodiment.
Figure 9:
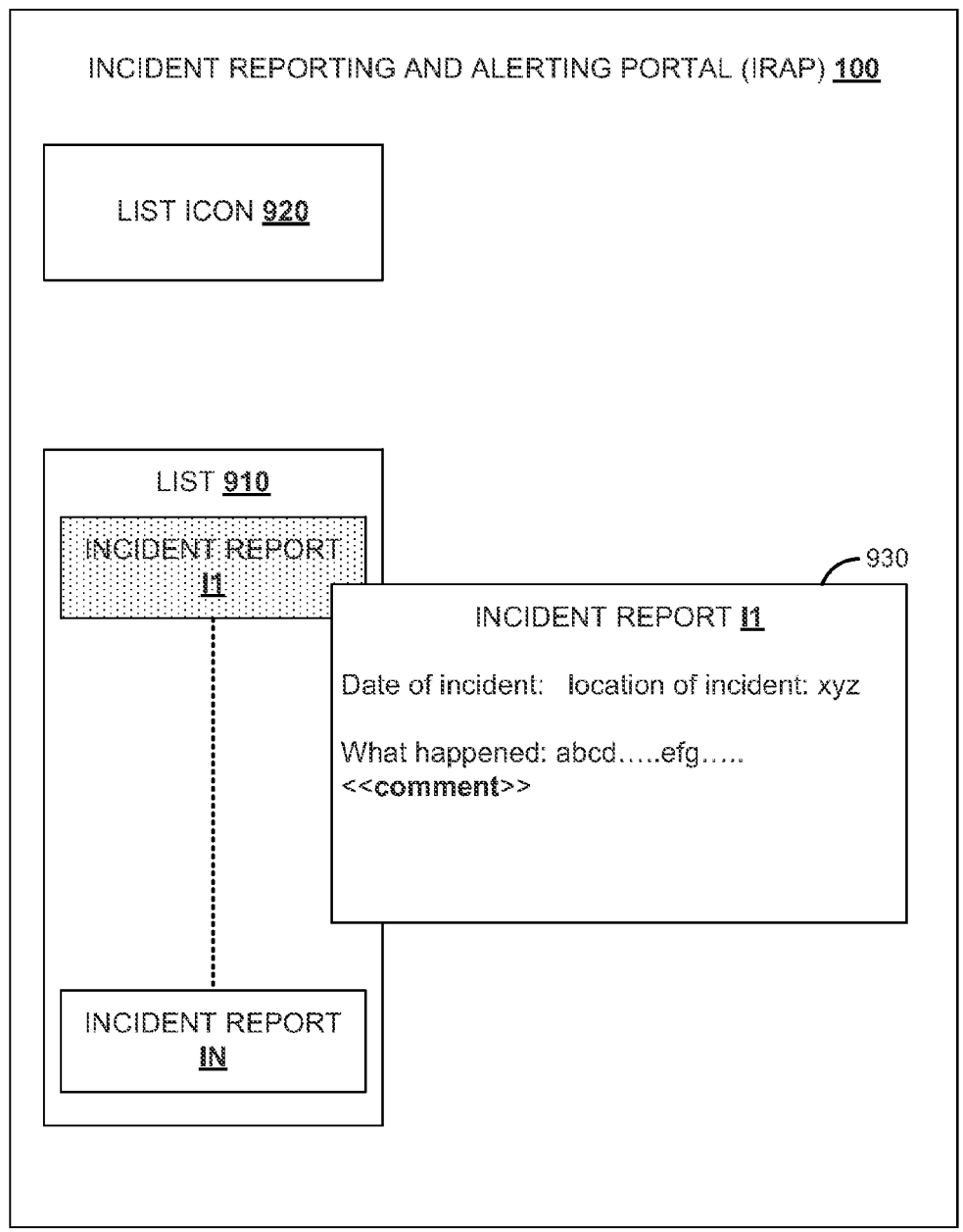
FIG. 9 illustrates an incident report displayed from a list of incident reports, according to an embodiment.

The volunteers 120 can place the widget 440 like 'report incident' icon on any website to enable anyone to report incidents and become the reporter 110. Alternately, the volunteer 120 encourages the users to report incidents. For example, the volunteer 120 can place the report incident icon on any social media sites such as Twitter®, Facebook®, etc., to encourage the users of those websites to report incidents. In one embodiment, the volunteer 120 is required to seek permission from an owner or manager of the websites to place the widgets 440 like 'report incident' icon upon their websites. In one embodiment, the volunteer 12.0 creates their portal or website 800 (FIG. 8) to enable reporters to report incidents. The website 800 includes a volunteer home page 810 and a report incident button 820 to encourage the participants or the users to report the incident.

In one embodiment, once the report incident button 820 is selected, multiple steps, e.g., step 1 and step 2 may be displayed in a new window 830 for reporting incident or submitting the incident report. In one embodiment, in step 1 the reporter 110 can enter various information related to the incident, e.g., location of the incident, the date and time of the incident, description of the incident and in step 2 various attachments, e.g., the image, the audio, or the video related to the incident may be uploaded. Once the information related to the incident is completed, the incident report may be submitted.

Once the incident report is submitted, the volunteer 120 may peruse the incident report. In one embodiment, the volunteer 120 may peruse the incident report to check whether the incident report is genuine. In one embodiment, the volunteer 120 may edit the incident report to further add information or to improve the quality of the incident report. In one embodiment, the volunteer 120 classifies the incident reports I1-IN. In another embodiment, the volunteer 120 rates the incident reports I1-IN. The incident reports I1-IN are rated based upon their usefulness, i.e., whether the incident report is useful or not.

In one embodiment, all the submitted incident reports I1-IN is displayed in a list 910. In one embodiment, the user selects an icon, e.g., a 'list' icon 920 to display the list 910. The list 910 may be filtered based upon various parameters related to the incident. In one embodiment, the parameters may include at least one of a geographical area or location of the incident, a time of the incident, and a category or type of the incident. The user can select an incident report I1 of their choice from the list 910. The selected incident report I1 is displayed in a window 930 stacked over the list 910. In another embodiment, the selected incident report I1 is displayed in a window generated as a separate web page (not shown).

The incident report I1 may be read by anyone. For example, the responder 130 can read the incident report. Upon reading the incident report I1, if the responder 130 has any query related to the incident report I1, the responder 130 can inquire about it. In one embodiment, the responder 130 can inquire about the incident report 11 by writing or embedding a comment (FIG. 4: bold font <<comment>>) inside the incident report I1. In one embodiment, the responder 130 is provided an inquiry tool 460 (FIG. 4) for inquiring about the incident. In one embodiment, when the responder 130 selects the inquiry tool 460, an inquiry window (not shown) may be generated. The inquiry window may include a 'submit inquiry' button. The responder 130 can compose the inquiry within the inquiry window. Once the inquiry is composed, the responder 130 can click the 'submit inquiry' button to submit the composed inquiry. In one embodiment, the submitted inquiry may be read by the volunteer 120. In another embodiment, the submitted inquiry may be read by the reporter 110.

The comment or inquiry is notified to the reporter 110 who submitted the incident report I1. The reporter 110 may reply back to the comment or inquiry. The reply is notified to the responder 130 who commented on the incident report I1. In one embodiment, the reply is sent to the responder 130 on their registered mobile phone via SMS or to their registered email ID. In another embodiment, the reply is also notified to one or more users interested in the incident.

Figure 10:
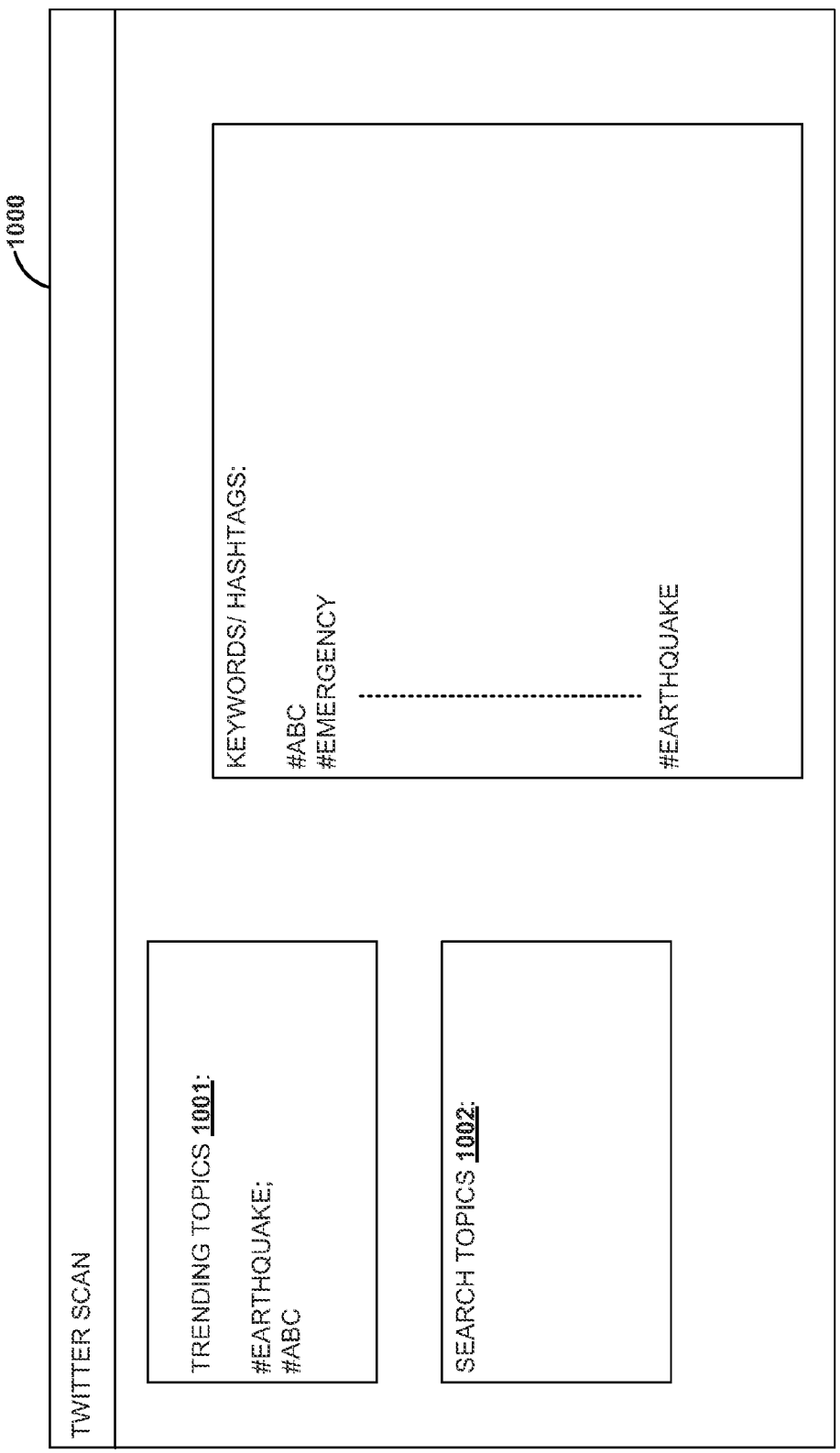
FIG. 10 illustrates a watch list window including various hash tags composed by the volunteer for gathering information related to the incident, according to an embodiment.

In one embodiment, the volunteer 120 is also provided a watch list widget 450 (FIG. 4). Using the watch list widget 450, the volunteer 120 can create various keywords or tags related to the incidents. In one embodiment, the tag may be a hash tag (i.e., the tag prefixed with a hash or # symbol) used on Twitter®. Once the watch list widget 450 is selected, a watch list window 1000 is displayed. The volunteer can create or compose several tags related to the incident. For example, as shown in FIG. 10, the volunteer can create the hash tags namely #ABC, #earthquake, and #emergency. The tags are then linked to the required social networking site containing information on those tags. For example, the hash tags #earthquake and #emergency are linked to Twitter®, Once the hash tags are linked to the required social media website, the information on the hash tags may be retrieved from that social media website. For example, once the hash tag, e.g., #earthquake is linked to the Twitter®, all the tweets related to the hash tag #earthquake are retrieved from the Twitter®. Typically, once the hash tag #earthquake is selected, the IRAP 100 connects to Twitter® and all the tweets related to the selected hash tag are downloaded and displayed. In one embodiment, the watch list window 1000 also includes trending topics 1001 illustrating current topics of discussion. The watch list window 1000 also includes a search topics tool 1002 to enable the volunteer 120 to search the topics of their interest.

Embodiments described above provide a single platform for all participants including reporters, volunteers, and responders to participate for reporting and handling incidents. Categorization of participants into reporters, volunteers, and responders provides a well-structured platform wherein the roles of participants are clearly defined to efficiently handle the incidents. Volunteers are the central entity that encourage, monitor, and guide other participants for reporting and handling incidents. The platform also encourages everyone to contribute to the incidents as the contribution of the participants are published, e.g., displayed to their friends. Various widgets and tools are provided to the participants to enable them to perform their task efficiently. The participants have flexibility to select the tools or widgets of their choice to perform their respective tasks. The platform is connectable to other social networking sites, e.g., Twitter®, Facebook®, etc., and therefore, the participants can easily report incidents from the social networking sites they use every day. Consequently, the system is efficient and user friendly which saves resource, time, and effort that might be wasted in gathering and channelizing the information to appropriate people. Additionally, the platform is extensible and new tools or widgets can be easily plugged-in into the platform.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, or other object-oriented programming language and development tools. Another embodiment may be implemented in hard-wired circuitry in place of or in combination with machine readable software instructions.

Figure 11:
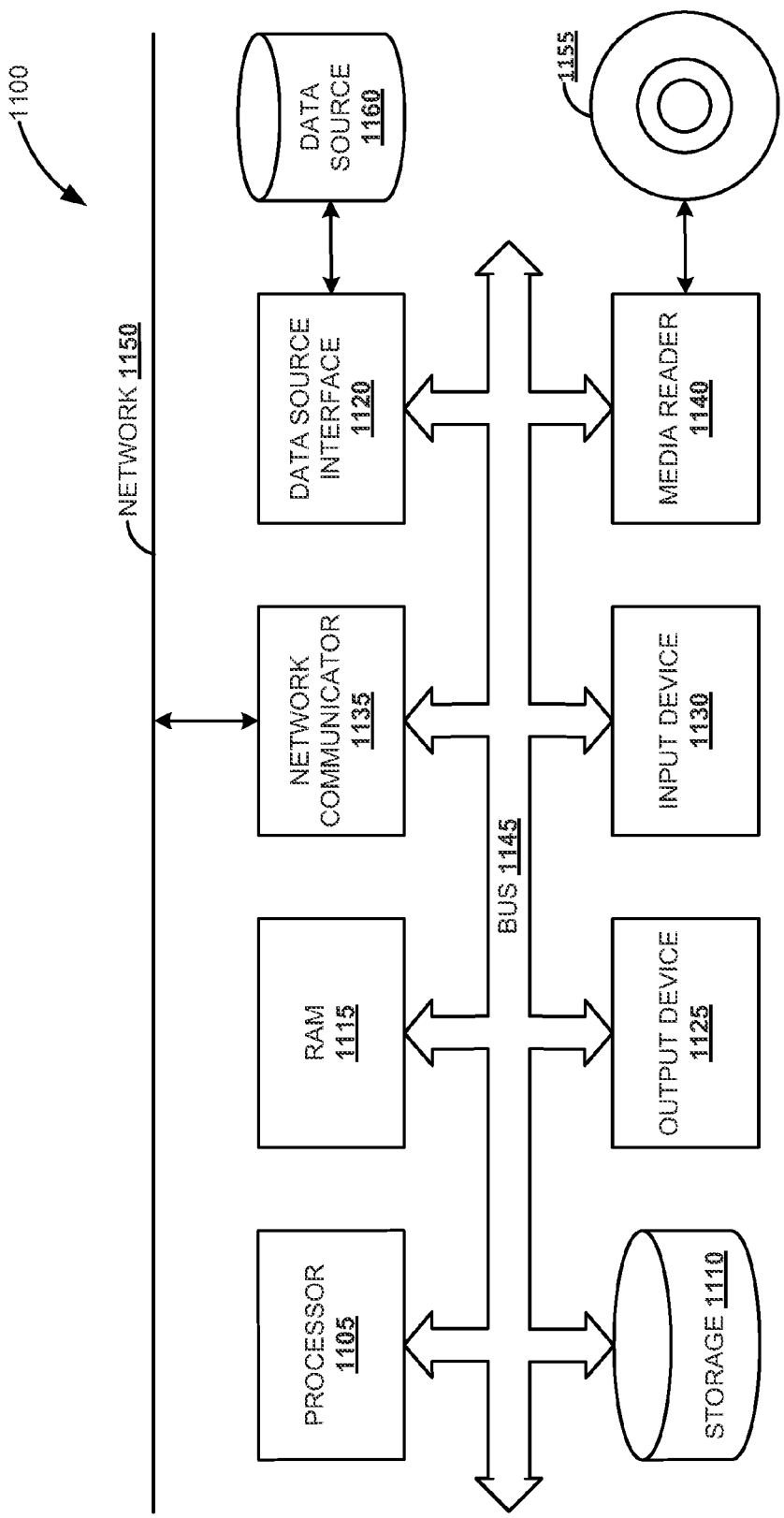
FIG. 11 is a block diagram of an exemplary computer system, according to an embodiment.

FIG. 11 is a block diagram of an exemplary computer system 1100. The computer system 1100 includes a processor 1105 that executes software instructions or code stored on a computer readable storage medium 1155 to perform the above-illustrated methods. The computer system 1100 includes a media reader 1140 to read the instructions from the computer readable storage medium 1155 and store the instructions in storage 1110 or in random access memory (RAM) 1115. The storage 1110 provides a large space for keeping static data where at least some instructions could be stored for later execution. The stored instructions may be further compiled to generate other representations of the instructions and dynamically stored in the RAM 1115. The processor 1105 reads instructions from the RAM 1115 and performs actions as instructed. According to one embodiment, the computer system 1100 further includes an output device 1125 (e.g., a display) to provide at least sonic of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100. A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments the data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an ERP system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the embodiments to the precise forms disclosed. While specific embodiments of and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments are to be determined by the following claims, which are to be interpreted in accordance with established doctrines of claim construction.

What is claimed is:

1. An article of manufacture including a non-transient computer readable storage medium to tangibly store instructions, which when executed by one or more computers in a network of computers causes performance of operations comprising:
identifying a user logged into an incident reporting and alerting portal;
identifying a category for the user, wherein the category includes one of a reporter, a volunteer, and a responder;
providing one or more widgets to the reporter to generate an incident report related to an incident and submit the incident report to the incident reporting and alerting portal;
providing one or more widgets to the volunteer to rate the incident report submitted by the reporter; and
providing one or more widgets to the responder to compose an inquiry related to the incident report submitted by the reporter.

2. The article of manufacture of claim 1 further comprising instructions which when executed cause the one or more computers to perform the operations comprising:
determining whether the inquiry is received from the responder;
when the inquiry is received from the responder, notifying the reporter about the inquiry;
determining whether a reply to the inquiry is received from the reporter; and
when the reply to the inquiry is received from the reporter, notifying the responder about the reply.

3. The article of manufacture of claim 1 further comprising instructions which when executed cause the one or more computers to perform the operations comprising:
providing the one or more widgets to the reporter to:
upload at least one of an audio, a video, and an image related to an incident, wherein at least one of the audio, the video, and the image is uploaded along with the incident report;
and
providing the one or more widgets to the volunteer to:
compose one or more keywords related to the incident;
link the composed keywords to a social media site having the information related to the respective keywords; and
create a website for collecting information including the incident report.

4. The article of manufacture of claim 3 further comprising instructions which when executed cause the one or more computers to perform the operations comprising:
receiving a selection of a keyword;
connecting to the social media site having the information on the selected keyword; and
displaying the information from the social media site.

5. The article of manufacture of claim 1, wherein the category is identified through a request received from the user during a first time logging into the incident reporting and alerting portal and wherein the request includes the category specified by the user.

6. The article of manufacture of claim 1, wherein the incident report comprises at least one of a text message, an image, an audio, and a video.

7. The article of manufacture of claim 1, wherein the incident report is submitted onto the incident reporting and alerting portal through at least one of an email, a short messaging service (SMS), and a web browser including a social networking site.

8. The article of manufacture of claim 1 further comprising instructions which when executed cause the one or more computers to send a confirmation message to the reporter submitted the incident report.

9. A method for reporting and managing incidents implemented on a network of one or more computers, the method comprising:
identifying a user logged into an incident reporting and alerting portal;
identifying a category for the user, wherein the category includes one of a reporter, a volunteer, and a responder;
receiving an incident report from the reporter;
determining whether a comment related to the incident report is received from the responder;
when the comment is received, notifying the reporter about the comment;
determining whether a reply to the comment is received; and
when the reply to the comment is received, notifying responder who commented on the incident report about the reply.

10. The method of claim 9 further comprising:
providing the one or more widgets to the reporter to:
upload at least one of an audio, a video, and an image related to an incident, wherein at least one of the audio, the video, and the image is uploaded along with the incident report;
and
providing the one or more widgets to the volunteer to:
compose one or more keywords related to the incident;
link the composed keywords to a social media site having the information on the respective keywords; and
create a website for collecting information including the incident report.

11. The method of claim 10, further comprising:
receiving a selection of a keyword;
connecting to the social media site having the information on the selected keyword; and
displaying the information from the social media site.

12. The method of claim 9 further comprising:
based upon the received incident report, sending a confirmation message to the reporter submitted the incident report;
receiving a request for registering the user as one of the reporter, the volunteer, and the responder, wherein the request includes the category specified by the user;
based upon the request, registering the user as one of the reporter, the volunteer, and the responder; and
storing information related to the registered users into a database.

13. The method of claim 9, further comprising:
identifying an action performed by the user, wherein the action comprises at least one of generating the incident report, commenting on the incident report, editing the received incident report;
based upon the identified action, automatically registering the user as one of the volunteer, the reporter, and the responder;
storing information of the registered user in a database;
determining whether contact information of the registered user is stored in the database; and
when the contact information is not stored in the database, inquiring about the contact information from the registered user.

14. A computer system for reporting and managing incidents comprising:
a memory to store program code; and
a processor communicatively coupled to the memory, the processor configured to execute the program code to cause one or more computers in a network of computers to:

identify a user logged into an incident reporting and alerting portal;

identify a category for the user, wherein the category includes one of a reporter, a volunteer, and a responder;

provide one or more widgets to the reporter to generate an incident report related to an incident and submit the incident report to the incident reporting and alerting portal;

provide one or more widgets to the volunteer to edit the incident report submitted by the reporter; and provide one or more widgets to the responder to compose an inquiry related to the incident report submitted by the reporter.

15. The computer system of claim 14, wherein the processor is further configured to perform the operations comprising:

determining whether the inquiry is received from the responder;

when the inquiry is received from the responder, notifying the reporter about the inquiry;

determining whether a reply to the inquiry is received from the reporter; and when the reply to the inquiry is received from the reporter, notifying the responder about the reply.

16. The computer system of claim 14, wherein the processor is further configured to perform at least one of the operations comprising:

providing the one or more widgets to the reporter to:
upload at least one of an audio, a video, and an image related to an incident, wherein at least one of the audio, the video, and the image is uploaded along with the incident report;
and providing the one or more widgets to the volunteer to:
compose one or more keywords related to the incident;
link the composed keywords to a social media site having the information on the respective keywords; and
create a website for collecting information including the incident report.

17. The computer system of claim 16, wherein the processor is further configured to perform the operations comprising:

receiving a selection of a keyword;
connecting to the social media site having the information on the selected keyword; and
displaying the information from the social media site.

18. The computer system of claim 14, wherein the processor is further configured to perform the operations comprising:

based upon the received incident report, sending a confirmation message to the reporter submitted the incident report;

receiving a request for registering the user as one of the reporter, the volunteer, and the responder, wherein the request includes the category specified by the user;

based upon the request, registering the user as one of the reporter, the volunteer, and the responder; and storing information related to the registered users into a database.

19. The computer system of claim 14, wherein the processor is further configured to perform the operations comprising:

identifying an action performed by the user, wherein the action comprises at least one of generating the incident report, commenting on the incident report, editing the received incident report;

based upon the identified action, automatically registering the user as one of the volunteer, the reporter, and the responder;

storing information of the registered user in a database;

determining whether contact information of the registered user is stored in the database; and when the contact information is not stored in the database, inquiring about the contact information from the registered user.

20. The computer system of claim 14, wherein the processor is further configured to send a confirmation message to the reporter submitted the incident report.

* * * * *